July 12, 1938. J. W. SMALL 2,123,615
TRAILER
Filed Jan. 15, 1937 2 Sheets-Sheet 1
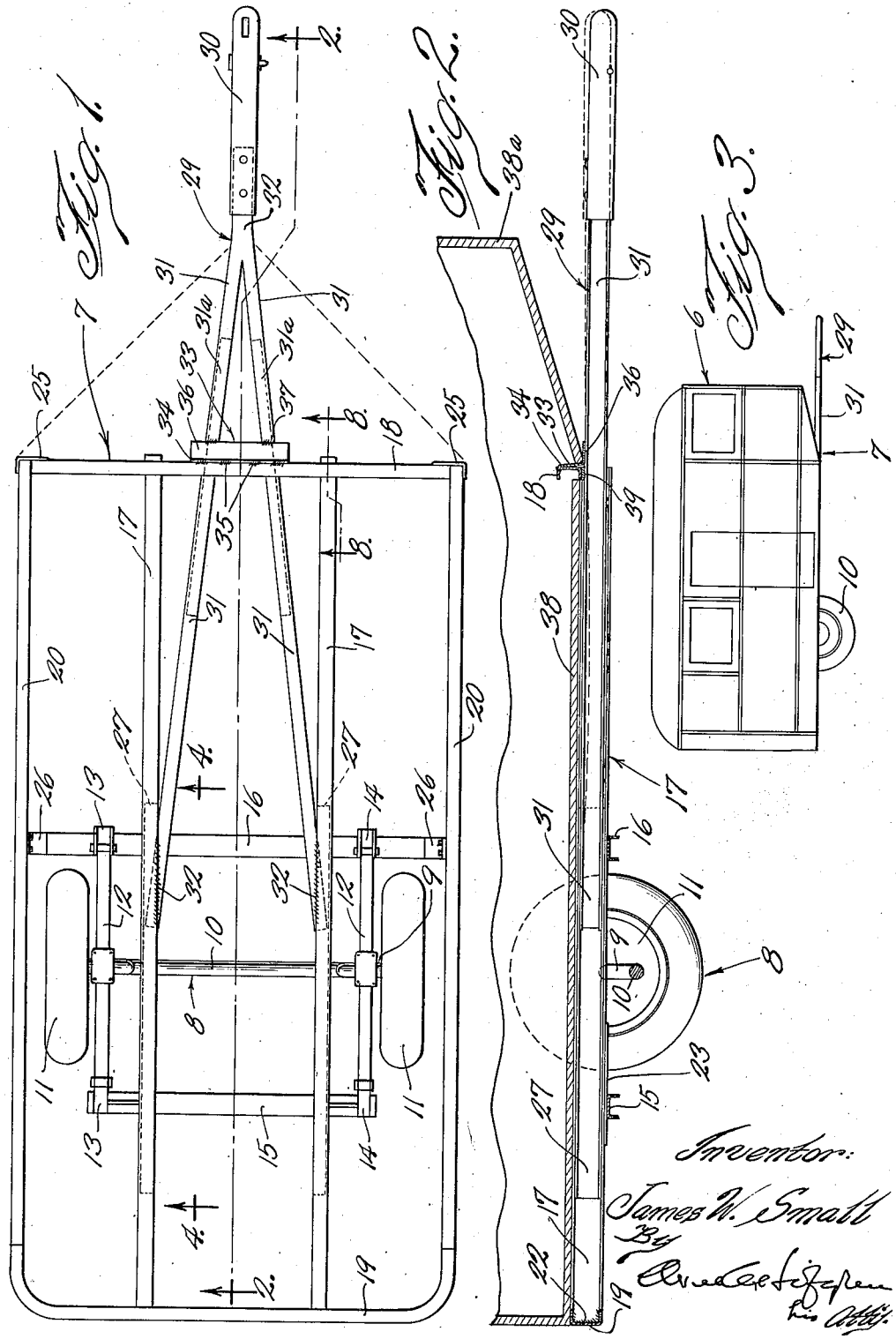

July 12, 1938. J. W. SMALL 2,123,615
TRAILER
Filed Jan. 15, 1937 2 Sheets-Sheet 2
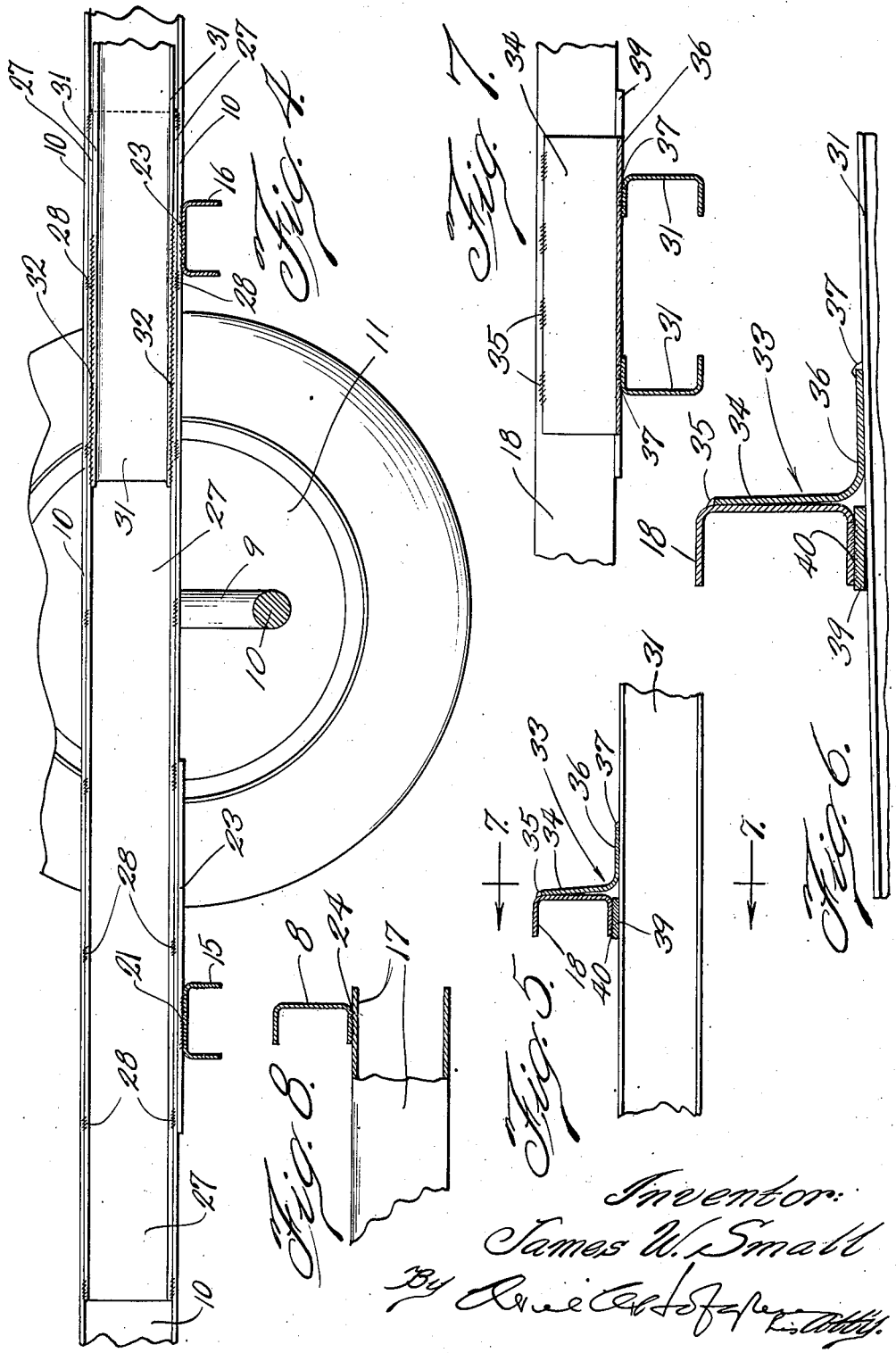
Inventor:
James W. Small Patented July 12, 1938

2,123,615

UNITED STATES PATENT OFFICE 2,123,615

TRAILER

James W. Small, Chicago, Ill.

Application January 15, 1937, Serial No. 120,742

15 Claims. (Cl. 280—33.4)

This application is a continuation in part of my copending application Serial No. 64,492, filed February 18, 1936, for Trailer.

The invention relates generally to a trailer, and more particulary to a tow bar and frame construction therefor.

It is a general object of the invention to provide a frame and tow bar structure for trailers wherein the stresses, imposed by oscillation of the trailer body due to road shocks and ordinary travel conditions, are absorbed and distributed in such a manner that breakage of the frame or tow bar and loosening of the trailer joints are eliminated.

Heretofore, oscillation of the trailer body has been damped by the flexing of the tow bar at the point at which it engages the front of the trailer body with the result that fatigue has set in at that point and breakage of the tow bar has occurred. Therefore, a more particular object of the invention is to provide a trailer frame structure with a tow bar which absorbs and damps oscillating movement of the trailer body about its axle by having a compensating oscillatory, natural flexing movement, the tow bar being yieldably connected with the frame whereby this compensating oscillatory movement is distributed throughout the length of the tow bar as compared to a bending movement at the connection with the frame to eliminate unduly excessive strains at any particular point thereof.

It is another object of the invention to provide a connection of such a character between the tow bar and a cross beam on the frame that the oscillation or flexing of the tow bar with the cross beam as its fulcrum will not impart a twisting movement to the cross beam.

Another object of the invention is to provide a frame and trailer construction in which the tow bar serves to reinforce the frame structure.

Another object of the invention is to provide a connection between the tow bar and the frame wherein shortening of the overall length of the tow bar section between the points of connection with the frame, due to flexing of the tow bar, is compensated for, thus eliminating a constant pulling on the joints of the frame during such flexing.

Another object of the invention is to provide a trailer frame which has longitudinal strengthening channels, a cross beam, to which the forward ends of the channels are connected, and a tow bar having its rear end connected to the channels at an intermediate point on the frame, its forward end extending beyond the trailer body and terminating in a hitch and having an intermediate point indirectly and yieldably connected with the front cross beam.

To attain the above object and as another advantage of the invention, the attachment of the tow bar with the cross beam is made through a spring steel, the tow bar being secured to one flange of the spring steel while the cross beam is secured to the other flange, this latter flange and the cross beam web being spaced whereby the connection between the tow bar and the cross beam is yieldable longitudinally of the frame by movement of the flange to and from the web of the cross beam, as well as pivotally of the cross beam by flexing of the spring steel.

Still another object of the invention is to provide a trailer frame and tow bar constructed from welded spring steel channel which in cross section has rounded corners so that when a web or flange, as the case may be, is welded to an adjacent part, the weld joint extends only to the beginning of the curvatures of the corners whereby the adjacent web or flange is not subjected to welding heat which tends to destroy the temper of the metal and thus weaken it.

Other objects and advantages of the invention will become apparent from the following description and attached drawings, in which:

Fig. 1 is a top plan view of the frame structure with the trailer body removed.

Fig. 2 is a view taken on the line 2—2 of Fig. 1 but with a fragmentary portion of the trailer body shown mounted thereon.

Fig. 3 is a side elevation of the complete trailer showing the body mounted on the frame.

Fig. 4 is an enlarged fragmentary view taken along line 4—4 of Fig. 1.

Fig. 5 is an enlarged fragmentary view of the cross beam and tow bar connection shown in Fig. 2.

Fig. 6 is an enlarged fragmentary view of Fig. 5 showing the connection when flexed.

Fig. 7 is a section taken on the line 7—7 of Fig. 5.

Fig. 8 is a section taken on the line 8—8 of Fig. 1.

It is to be understood that the preferred embodiment of the invention shown herein is for illustrative purposes only, and that changes and modifications thereof may be made without departing from the spirit of the invention as set out in the appended claims.

As shown herein, the trailer comprises generally a body or super-structure 6, a frame structure 7 upon which the body is mounted, and a truck assembly 8. The latter comprises an axle 9 having a drop center 10 and wheels 11 mounted on the ends of the axle. Secured near each end of the axle intermediate the wheel and the drop center, so as to extend transversely of the axle and longitudinally of the frame, is a spring 12 secured at its ends to cross beams 15 and 16 forming a part of the frame 7. To permit flexing of the springs, the ends are preferably connected to the cross beams by means of shackles 13 and 14.

In addition to the cross beams 15 and 16, the frame comprises longitudinal beams 17, a front cross beam 18 and a rear cross beam 19. To obtain strength with a light construction, the beams here employed are steel channels suitably secured together to provide a rigid structure. A pair of wooden side members 20 is provided to complete the frame structure. The beams 17 extend longitudinally of the frame with their flanges directed inwardly, the lower flanges being welded at their edges as at 21 (see Fig. 4) to the horizontal webs of cross members 15 and 16 and the edges of strips 23 interposed between the cross members 15 and 16 and the longitudinal beams 17. The purpose of the strips 23 is to place beams 17 in proper alinement. The rear ends of beams 17 are coped to fit against the inside of the web of the rear cross member 19 and between the forwardly extending flanges thereof, in which position they are welded as at 22. The forward ends of beams 17 pass beneath the lower, rearwardly extending flange of the front cross beam 18, the upper flanges of beams 17 and the lower flange of beam 18 being welded together as at 24 (Fig. 8). The frame proper is then completed by fastening the forward ends of the wooden beams 20 to the ends of cross beam 18 by suitable angle irons 25, the rear ends thereof to the ends of the rear cross member 19 which are bent toward the front of the frame and the center thereof to angles 26 which in turn are secured to the ends of cross member 16. If it is found desirable to have added strength in the beams 17 in the vicinity of the truck assembly, channels 27 may be nested therein and welded in place by edge welds as at 28 (Fig. 4).

In welding channel irons together, it is found that when the weld joint is extended throughout the entire depth of a web or flange, the heat necessary for the welding operation is transmitted to the adjacent web or flange as the welding progresses closer to the corner of the channel. This heat which is transmitted to the adjacent web or flange tends to destroy the temper of that portion of the channel, thereby weakening it. To obviate this difficulty, there is provided herein steel channel of carbon steel which has rounded corners (Figs. 4 and 5). The contact between the webs or flanges of the channels having such a shape and the weld joint which connects them does not extend the entire depth of the web or flange to the edge of the adjacent portion of the channels but only to the beginning of the curvature of the corners. This will be readily seen by reference to welds 21 in Fig. 4, the ends of which are spaced a considerable distance from the depending flanges of beams 15 and 16. Thus it is possible, when welding, to avoid applying heat to the corner of the channels and the temper of the metal, at the edges of those adjacent webs or flanges which are not actually being welded, is retained.

Because of the relative independence of movement of the towing vehicle and the trailer, the tow bar of the trailer must have a rugged attachment with the frame. To this end, there is provided herein a tow bar designated generally as 29 comprising a hitch section 30 having suitable means for connection with the towing vehicle. The tow bar proper extends rearwardly of the hitch and consists of a pair of legs 31 which diverge rearwardly in a straight line from a forward arm 32 to which the hitch 30 is attached. The legs 31 are formed from steel channel having the cross sectional shape previously described and the rear ends thereof are nested with the beams 17 or within the channels 27 if such channels are provided. The legs are secured to the frame by welding the upper flanges thereof to beams 17 as at 32 (Figs. 1 and 4), and by connecting each leg, at a point intermediate the junction of the legs and the rear ends thereof, to the cross beam 18 in a manner to be more fully described presently. With this two-point connection of the tow to the frame as at 32—32 and to the cross beam 18, severe strains, caused by sudden lateral movement of the tow bar are readily withstood by the frame, since the portions of legs 31 between the cross beam 18 and welds 32 serve as strut reinforcements. These strains are also withstood by the tow bar itself since the diverging legs extend somewhat laterally, have portions 31a extending forwardly of the cross beam 18 and provide a two-point contact with the cross beam 18 at those points at which legs 31 cross it and with the frame at the connections with beams 17.

Under traveling conditions, the slightest unevenness in the road being traveled causes oscillation of the frame and the trailer body about the axle 11. This oscillation is very detrimental to traveling comfort and is damaging to the trailer. To the end that such oscillation will be eliminated, the tow bar legs 31 are slightly flexible so that oscillations of the frame and trailer body are absorbed and damped by compensating flexure of the tow bar.

In order that this flexure in the tow bar legs will not be concentrated at the point of contact with the front cross beam 18, under which circumstances fatigue will set in and cause breakage of the legs at that point, a connection is provided between the legs 31 and the cross beam 18 which is of such a character that it eliminates bending of the legs at that point and permits them to flex about the cross beam as their fulcrum by enhancing the flexure of that portion of the legs 31 between welds 32 and the cross beam 18. In the present embodiment, this connection comprises a spring steel angle 33 having a pair of flanges, one a vertical flange 34 positioned in spaced relationship to the front face of the web of the cross beam (Figs. 2, 5 and 7) and welded to the web along its upper edge as at 35 and the other a horizontal flange 36 overlying the upper flanges of legs 31 and welded thereto as at 37. The angle 33 is made of carbon steel and the flanges 34 and 36 are slightly yieldable to give slight hinge action during the flexure of the tow bar. Thus it will be seen that because the connection between legs 31 and cross beam 18 is yieldable, oscillation of the frame and trailer body about the axle 11 results in a compensating flexure in the legs 31. This flexure is distributed throughout the length of the legs 31 due to a flexing movement of the legs about the cross beams, which movement is permitted by the yielding hinge action of angle 33. This flexure is shown in dotted lines in Fig. 2, and from the shape of the legs as shown in dotted lines, it will be seen that downward movement of the front of the trailer, while the hitch is held vertically stationary by the towing vehicle, will cause like downward flexing of those portions of the legs between the welds 32 and the cross beam 18 and upward flexing of the portions 31a of the legs 31, thus eliminating any bending of the tow bar at the point at which it crosses beam 18. In order that the floor 38 of the trailer body is raised sufficiently far above the tow bar to prevent bumping of the legs 31 during the upward flexing movement thereof, a filler strip 39 is interposed between the lower flange of the cross beam 18 and the upper flange of the legs 31. This strip 39 is welded as at 40 to the lower flange of the cross beam 18 and is left to engage freely the upper surface of the upper flanges of tow bar legs 31, thereby avoiding any direct connection between cross beam 18 and legs 31.

A further advantage of the yieldable connection between the legs 31 and the cross beam 18 is the preservation of the joints between the component parts of the trailer frame. The hinge action of the connection shown herein prevents the cross piece 18 from becoming distorted by twisting during the flexing movement of legs 31, which twisting, if not prevented, would impose excessive strain on the adjacent joints of the trailer parts.

When the rear portion of the legs 31 between welds 32 and cross beam 18 flex as shown in Fig. 2, it will be readily understood that a resulting shortening of that portion of the legs takes place. To the end that compensating strains, such as rearward bending of the cross beam 18 and other parts of the frame, will be eliminated, the flange 34 of the angle 33 is spaced from the web of the cross beam as previously described. By reference to Fig. 5, in which the connection is at rest, and to Fig. 6, in which a downward flexing of the legs has occurred, it will be seen that the shortening of the legs has been compensated for by movement of the legs 31 longitudinally rearwardly beneath the strip 39 and movement of the lower portion of flange 34 rearwardly toward the web of the cross beam 18 rather than by a rearward flexing of the cross beam.

From the foregoing, it will be seen that I have provided a trailer having a rugged frame, with a tow bar which is adapted to withstand lateral strains and to compensate for oscillations of the trailer without breaking or subjecting the trailer frame to destructive strains during such compensation, this compensation being provided by the simultaneous pivotal action and longitudinal movement between the tow bar and the cross beam 18 during flexure of the tow bar.

It is contemplated that the steel angle 33, while flexible, will have sufficient rigidity to withstand in a measure the above described compensating movements and thus serve to dampen relative movement between the cross beam 18 and the tow bar. This damping action of the angle 33 serves to prevent the development of a bounce in the trailer body due to successive undulations in the road being traveled.

Furthermore, it will be seen that the angle 33 and the tow bar may be secured to the frame last whereby the angle and the tow bar may be mounted on the frame in an entirely relaxed position before they are welded to the frame.

I claim as my invention:

1. In a trailer frame having a supporting truck assembly, a pair of longitudinal beams on said assembly, a cross beam, the forward end of each of said longitudinal beams being rigidly secured to said cross beam, a tow bar having its forward end extending outwardly beyond the cross beam and terminating in a hitch, said tow bar being yoked rearwardly of said hitch and forwardly of said cross beam to provide a pair of straight, rearwardly diverging legs, each of said legs having its rear end rigidly secured to a respective longitudinal supporting beam at an intermediate point of the frame, extending beneath the cross beam and being adapted to flex about the cross beam as its fulcrum during oscillation of the frame about the axle of the truck assembly, and means for attaching said legs to said cross beam comprising an angle iron positioned with respect to the cross beam and legs with its vertical flange extending along the forward vertical face of said cross beam and in spaced relationship thereto and its horizontal flange overlying the upper faces of the legs of the tow bar, the upper edge of said vertical flange being welded to the adjacent portion of the forward face of the cross beam, and the outer edge of the horizontal flange being welded to the adjacent portion of the upper faces of the legs.

2. In a trailer having a supporting truck assembly, the combination of a frame secured to the truck assembly and comprising a pair of longitudinal beams, a cross beam, the forward end of each of said longitudinal beams being secured to said cross beam, and a tow bar having its forward end extending beyond the cross beam and terminating in a hitch, said tow bar being yoked forwardly of said cross beam to provide a pair of straight, diverging legs, each of said legs having its rear end secured to a respective longitudinal beam, extending beneath the cross beam and yieldably connected with the cross beam and being adapted to flex with the cross beam as its fulcrum during oscillation of the frame about the axle of the truck assembly.

3. In a trailer frame, longitudinal supporting beams, a cross beam secured to the forward end of each of said longitudinal beams, a tow bar having its forward end extending forwardly beyond the cross beam and terminating in a hitch, said tow bar having its rear end rigidly secured to an intermediate point of the frame, extending beneath the cross beam and being adapted to flex about the cross beam as its fulcrum during oscillation of the frame, and means for securing said tow bar to said cross beam comprising an angle iron positioned with respect to the cross beam and tow bar with a vertical flange extending along the forward vertical face of said cross beam and in spaced relationship thereto and a horizontal flange overlying the upper face of the tow bar, the upper edge of said vertical flange being secured to the adjacent portion of the forward face of the cross beam and the outer edge of the horizontal flange being secured to the adjacent portion of the upper face of the tow bar.

4. In a trailer, a frame having a cross beam at its forward end, a tow bar having its forward end extending beyond the cross beam and terminating in a hitch, said tow bar having its rear end rigidly secured to a portion of the frame intermediate the length thereof, extending beneath the cross beam and being adapted to flex about the cross beam as its fulcrum during oscillation of the frame, and means for securing said tow bar to said cross beam comprising a member having a vertical element and a horizontal element and positioned with respect to the cross beam and tow bar with the vertical element extending along the forward vertical face of said cross beam and in spaced relationship thereto, and its horizontal element overlying the upper face of the tow bar, the upper edge of said vertical element being secured to the adjacent portion of the forward face of the cross beam and the outer edge of the horizontal member being secured to the adjacent portion of the upper face of the tow bar, said elements being connected for yieldable movement therebetween.

5. In a trailer, a frame having a cross beam at its forward end, a tow bar having its forward end extending beyond the front of the frame and terminating in a hitch, said tow bar having its rear end rigidly secured to a portion of the frame intermediate the length thereof, extending across the cross beam and being adapted to flex about the cross beam as its fulcrum during oscillation of the frame, and means for yieldably securing said tow bar to said cross beam comprising a member having a vertical element and a horizontal element and positioned with respect to the cross beam and tow bar with the vertical element extending along the forward vertical face of said cross beam and its horizontal element overlying the upper face of the tow bar, the upper edge of said vertical element being secured to the adjacent portion of the forward face of the cross beam and the outer edge of the horizontal element being secured to the adjacent portion of the upper face of the tow bar legs, said elements being connected for yieldable movement therebetween.

6. In a trailer, a frame having a cross beam at its forward end, a tow bar having its forward end extending beyond the front of the frame and terminating in a hitch, said tow bar having its rear end rigidly secured to a portion of the frame intermediate the length thereof, extending across the cross beam and being adapted to flex about the cross beam as its fulcrum during oscillation of the frame, and means for yieldably securing said tow bar to said cross beam comprising a member having one portion connected with the cross beam and another portion connected with the tow bar to permit flexure of the portion of the tow bar on one side of the cross beam in one direction to cause opposed movement of the portion of the tow bar on the other side thereof.

7. In a trailer, a sub-frame having a cross beam, a tow bar having its rear portion extending alongside of portions of the front of the sub-frame with its rear end connected with the sub-frame at a point intermediate the length thereof and extending outwardly beyond the front end of the sub-frame beyond said cross beam, and means for yieldably connecting said tow bar with said cross beam comprising a member having one portion connected with the upper face of the tow bar to permit tilting of the tow bar laterally of the cross beam.

8. In a trailer having a supporting truck assembly, a frame mounted on said assembly, a tow bar connected to said frame, the rear portion of said tow bar underlying the front portion of the sub-frame and being connected at its rear end to an intermediate point of the frame, a hitch formed by the forward end of said tow bar extending outwardly of the front end of said frame, said tow bar being adapted to flex about the front end of the frame as its fulcrum during oscillation of the trailer about the axle of the truck assembly, and means including a resilient member for connecting said tow bar with the front end of said frame to permit slight flexing and longitudinal movement of said tow bar relative to the front end of said frame.

9. In a trailer having a supporting truck assembly, a frame mounted on said assembly, a tow bar connected to said frame, said tow bar having its rear portion extending rearwardly of the front of the frame and being connected at its rear end to an intermediate point of the frame, a hitch formed by the forward end of said tow bar extending outwardly of the front end of the frame, said tow bar being adapted to flex about the front end of the frame as its fulcrum during oscillation of the trailer about the axle of the truck assembly, and means including a resilient member for yieldably connecting said tow bar with the front end of said frame to permit flexing movement of said tow bar relative to the front end of said frame.

10. In a trailer, a frame, a tow bar, said tow bar having its forward end extending outwardly to provide a hitch and having its rear portion extending within the frame, the rear end of said tow bar being connected with the frame at a point intermediate the length thereof, and a yieldable connection between the front end of said frame and an intermediate point on the tow bar permitting the flexure of the tow bar to be distributed throughout the entire length thereof during oscillation of the front end of the frame.

11. In a trailer frame including a supporting truck assembly, a frame mounted on said assembly and a tow bar connected to said frame, said tow bar being connected at its rear end to an intermediate point of the frame, terminating in a hitch extending outwardly of the forward end of the frame and being adapted to flex about the front of the frame as its fulcrum during oscillation of the frame about the axle of the truck assembly, and means for connecting said tow bar to the front of the frame comprising an angle iron having a horizontal flange overlying said tow bar, and a vertical flange adjacent the front end of the frame, said flanges being connected with said frame and tow bar along their respective edges.

12. In a trailer having a supporting truck assembly, a frame mounted on said assembly, a tow bar connected to said frame, the rear portion of said tow bar projecting alongside of portions of the front of the frame and being connected at its rear end to an intermediate point of the frame, a hitch formed by the forward end of said tow bar extending outwardly of the front end of the frame, and means including a resilient member for connecting said tow bar with the front end of said frame to permit longitudinal movement of said tow bar relative to the front end of said frame.

13. In a trailer, a channel iron frame having a front cross beam with its web in a vertical plane and a forked tow bar freely contacting the cross beam at laterally spaced points, and means for connecting said tow bar to said cross beam comprising an angular member having a vertical element extending substantially the height of the web of the cross beam in spaced relationship thereto and having a weld connection with said cross beam along the upper edge thereof and a horizontal element adapted to overlie the tow bar at the points at which it crosses the cross beam, said horizontal element being secured to the tow bar by weld connections along the portions of its outer edge which overlie the tow bar.

14. A frame for a trailer having a front cross beam made from channel iron and having its web in a vertical plane, a tow bar extending forwardly of the frame and rearwardly to an anchorage intermediate the length of the frame and abutting the lower flange of the cross beam at the point where they cross for free movement relative therewith, means for connecting the tow bar and the cross beam together comprising an angular member having a horizontal portion secured to the upper surface of the tow bar, and a vertical portion extending substantially the entire width of the web of the cross piece in spaced relation thereto and being secured to the web at the upper extremity thereof.

15. A frame for a trailer having a front cross beam, a tow bar beam extending forwardly of the frame and rearwardly to an anchorage intermediate the length of the frame and abutting the cross beam at a point where they cross for restrained movement relative thereto, a connection for the cross beam and tow bar beam comprising flexible means secured to said beams to permit relative longitudinal movement between said tow bar beam and said cross beam.

JAMES W. SMALL.